Figure 1:
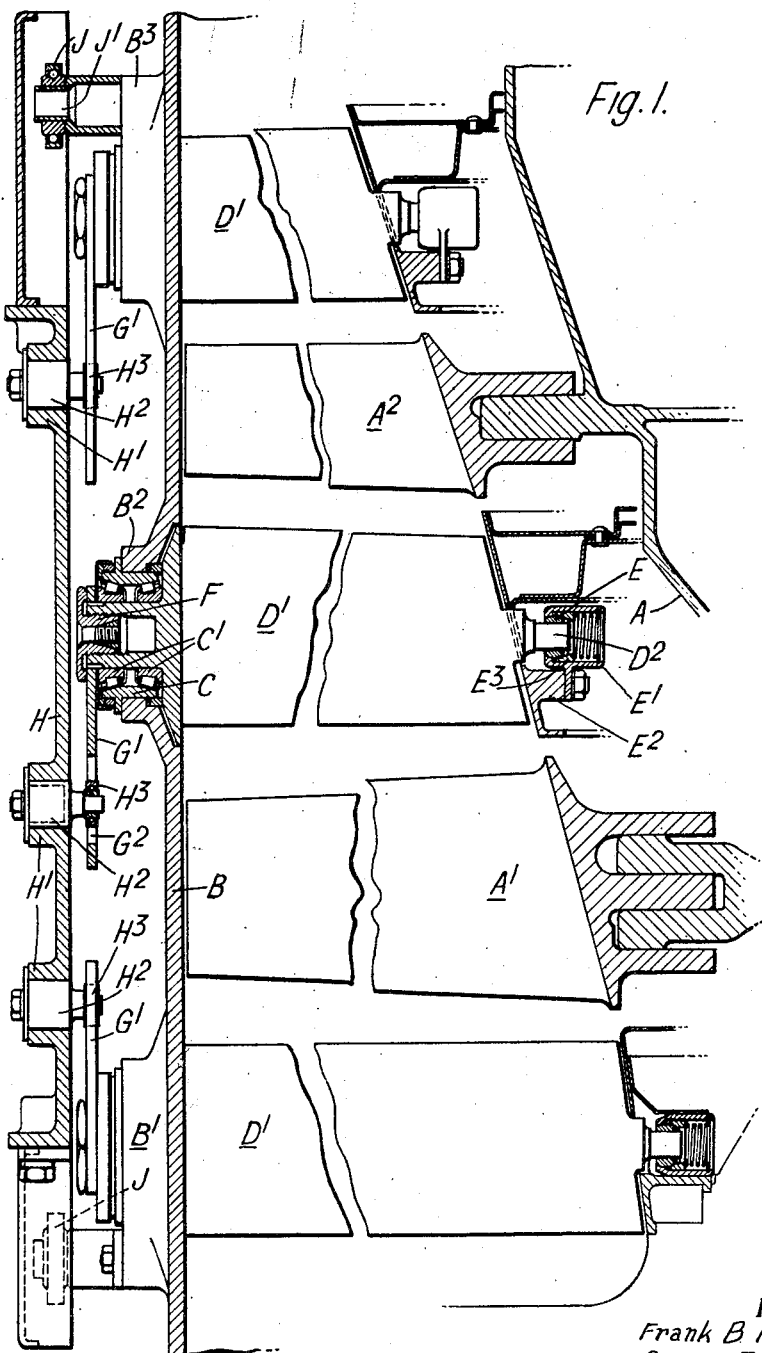

Inventor
Frank B. Halford
George F. Clarke
By
Attorney

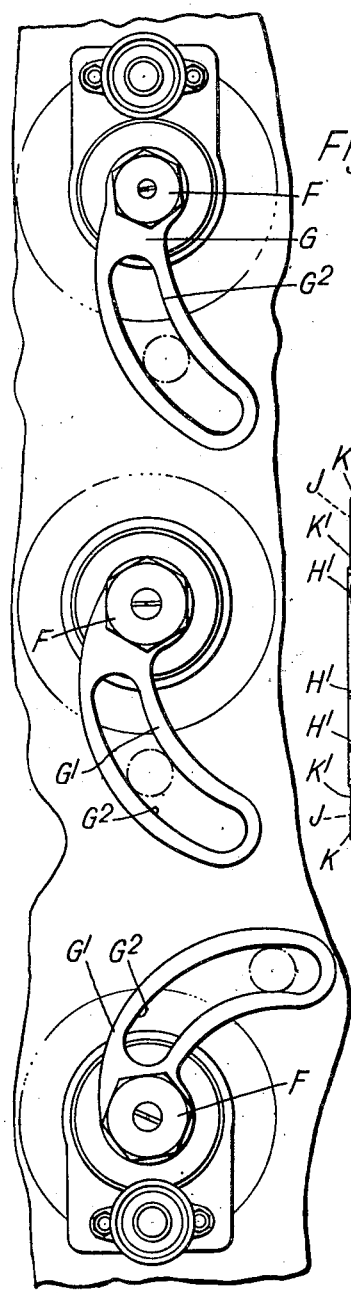
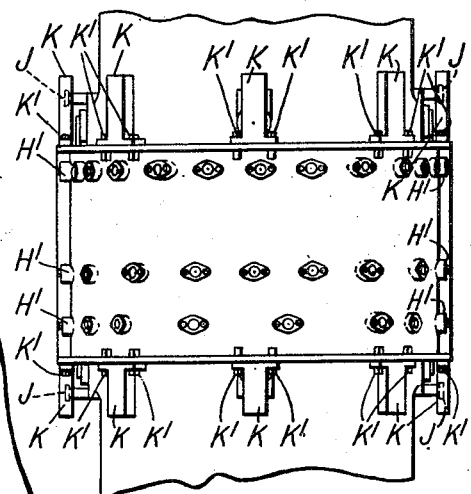
Fig. 3.
Fig. 4.

United States Patent Office 2,778,564
Patented Jan. 22, 1957

2,778,564

STATOR BLADE RING ASSEMBLIES FOR AXIAL FLOW COMPRESSORS AND THE LIKE

Frank B. Halford, Edgware, and George F. Clarke, Stanmore, England, assignors to The De Havilland Engine Company Limited, Leavesden, England, a British company Application December 6, 1954, Serial No. 473,408

4 Claims. (Cl. 230—114)

This invention relates to stator blade ring assemblies for axial flow compressors or the like comprising at least one ring of stator blades extending across an annular passage through which working fluid is to flow, the longitudinal axis of each blade being approximately radial with respect to the main axis of the annular passage or tangential with respect to a circle of relatively small diameter having its centre on such axis and means being provided for adjusting simultaneously the angle of incidence of the blades constituting the ring or each of a number of rings of blades by rotational movement of each blade about an axis coincident with or parallel to its longitudinal axis.

The terms "radial" and "tangential" used herein are to be interpreted to include the case where the direction referred to also has a component in a direction parallel to the main axis of the annular passage.

An object of the invention is to provide an arrangement including means for simultaneously adjusting the angle of incidence of the blades in a ring or rings which will be compact and satisfactory and, where two or more rings of adjustable blades are provided, will be readily applicable to the case where it is desired to vary the angle of incidence of the blades in the two or more rings differently but in some predetermined relationship to one another.

According to the present invention a stator blade ring assembly for an axial flow compressor or the like comprises a series of stator blades each extending in an approximately radial direction or in a direction which is tangential to a circle of relatively small diameter across an annular passage through which the working fluid is to flow and each mounted to pivot about an axis, which is coincident with or parallel to its longitudinal axis, an outer supporting ring in which the outer ends of the blades are pivotally supported, a cam member rigidly secured to the outer end of each blade, and projecting therefrom in a direction having a substantial radial component relatively to the pivotal axis of the blade, an operating ring or sleeve surrounding the blade-supporting ring and carrying a series of follower members respectively engaging the cam members, and means for moving the operating ring or sleeve bodily in relation to the blade-supporting ring so that the follower members act simultaneously on the cam members to rock the blades simultaneously and similarly about their pivotal axes.

Preferably in a stator blade ring assembly according to the invention each of the cam members and its associated follower are such that for any setting of the operating ring or sleeve the angular position of each blade is positively determined by the cam member; that is to say each cam member acts in two opposed directions upon the follower member.

Moreover the movement of the operating ring or sleeve is preferably parallel to the axis of the blade ring assembly as a whole while moreover the surfaces of the cam members on which the followers act are curved and extend in a direction which has a large component parallel to the main axis of the assembly, the form of the curved surfaces thus determining the law relating the axial movement of the operating ring or sleeve to the angular movement imparted to the blades.

Thus in one convenient arrangement each of the cam members is in the form of an arm having an arcuate slot formed therein the sides of which slot constitute the cam surfaces while each follower is in the form of a roller or pin lying within the slot so as to engage the sides thereof.

Where, as will frequently be the case, a compressor or the like includes two or more stator blade ring assemblies each constructed and arranged in accordance with the invention, the operating rings or sleeves for the various assemblies will be rigidly connected to one another or formed as a unit so as to be moved bodily to effect simultaneous angular control of the blades in the two or more rings, in which case it will be seen that the law relating the angular movements of the blades respectively in the two or more rings to one another and to the movement of the operating ring or sleeve is determined by the form of the curved cam surfaces of the cam members associated respectively with the blades in the two or more blade rings.

Thus the form of the cam surfaces of the cam members associated with the different blade rings can be so determined as to cause movement of the blades in the different rings in the required relationship substantially irrespective of what this relationship is.

Figure 2:
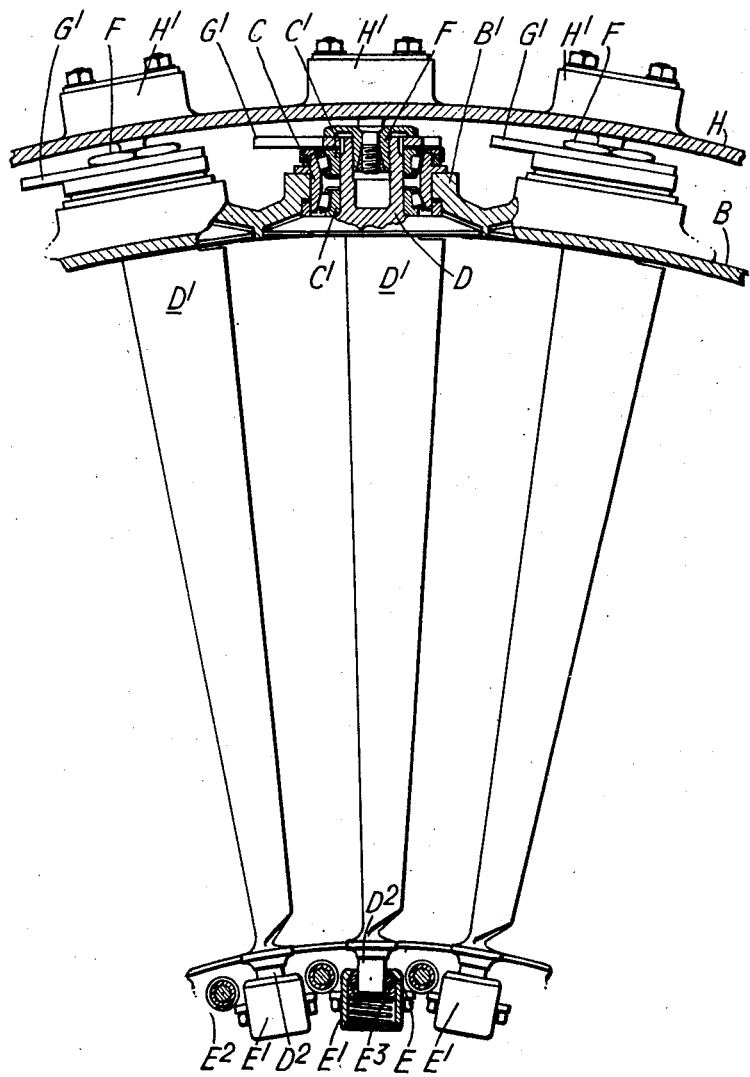

The invention may be carried into practice in various ways but one construction according to the invention is illustrated by way of example in the accompanying drawings in which Figure 1 is a sectional side elevation in a plane containing the axis of a compressor embodying the invention, Figure 2 is an end elevation of the arrangement shown in Figure 1 showing the supports for one of the blades in section, and those of another blade in full line for the sake of illustration, Figure 3 is a plan view showing the form of the curved cam members employed in the construction shown in Figures 1 and 2, all other parts being omitted for the sake of clarity, and Figure 4 is a plan view of the construction shown in Figures 1, 2 and 3, broken away for the sake of compactness.

In the construction shown the compressor comprises a rotor indicated generally at A carrying rings of rotor blades as indicated at $A^1$, $A^2$ interposed between rings of stator blades forming part of a stator blade assembly comprising, in this instance, three axially displaced rings of adjustable stator blades which, it will be understood, may be followed by further rings of non-adjustable stator blades associated with one or some further rings of rotor blades.

The stator blade assembly comprises a tubular casing B constituting an outer supporting ring having formed thereon three rings of bosses $B^1$, $B^2$, $B^3$ with the bosses in each ring equal in number to the stator blades in that ring.

Each of the bosses $B^1$, $B^2$, $B^3$ is formed hollow to provide a bore in which is rigidly mounted the outer bearing race C of a roller bearing of the combined axial and radial type having as shown two inner races $C^1$ associated respectively with two rows of rollers. The axes of the bores in the bosses $B^1$, $B^2$, $B^3$ in the construction shown are coincident with the axes of the blades associated with them and in the construction shown are radial, although they may be tangential to a relatively small circle having the axis of the tubular casing B for centre. The inner races $C^1$ of each bearing support within them a cylindrical pin D formed integral with the outer end of a blade $D^1$ forming one of the blades of the appropriate blade ring so that the outer end of each blade is supported from the rigid tubular casing B in a manner enabling each blade to rock about its longitudinal axis. The inner ends of the blades in each blade ring are formed with pins $D^2$ by which they are supported in spherical bearings E arranged in tubular houses $E^1$ secured to a shroud ring $E^2$, the outer member of each spherical bearing E comprising a part formed integral with the housing $E^1$ and a spring-pressed thrust ring $E^3$ in a manner known per se.

Rigidly secured, as by means of splines and a suitable securing bolt F to the outer end of each blade carrying pin D is a cam member in the form of an arm $G^1$ extending in a direction which has a large radial component with respect to the pivotal axis of the blade $D^1$ and is curved when viewed in plan, as shown most clearly in Figure 3, each curved arm G being provided with a similarly curved slot $G^2$ the sides of which form cam surfaces.

As will be clear from the drawings, each of the arms $G^1$ extends in a direction having a substantial component parallel to the longitudinal axis of the tubular casing B, the arms $G^1$ associated with two of the blade rings extending in the same axial direction while the arm $G^1$ of the third blade ring extends in the opposite axial direction.

Surrounding the tubular casing B is a control ring or sleeve H having formed thereon three rings of hollow bosses $H^1$, the axes of the bores in each ring of bosses being parallel to but displaced from the pivotal axes of the corresponding blades in the appropriate one of the blade rings.

Rigidly mounted within the bores of the bosses $H^1$ are cylindrical supporting members $H^2$ carrying at their inner ends rollers $H^3$ mounted on ball bearings and engaging the slots $G^2$ in the arm $G^1$ with the rollers making a free but good working fit with the sides of the slots so that they substantially exactly determine the angular position of the arms $G^1$ and hence of the blades $D^1$.

The control sleeve H is supported upon rollers J mounted upon radial trunnions $J^1$ rigidly secured to the tubular casing B, the rollers engaging the sides of longitudinal slots in guide members K rigidly secured by bolts $K^1$ to the ends of the sleeve H.

As will be apparent from Figure 4, the sleeve H is supported in this way upon eight rollers J and their associated guide members K at each side.

The control sleeve H is therefore longitudinally movable but not rotatable relatively to the rigid tubular casing B and it will be seen that such longitudinal movement will cause simultaneous pivotal movements of the blades $D^1$ in the three blade rings by reason of the inter-action between the rollers $H^3$ and the cam surfaces constituted by the sides of the slots $G^2$. It will moreover be seen that, by employing suitable curvatures for the slots $G^2$ in the arms $G^1$ associated with the various rings of blades, the pivotal movement imparted to the various rings can either be the same or different, and in either case can be exactly determined in relation to the movement of the control sleeve H. In the construction shown in the drawings the first ring of stator blade $D^1$, that is to say, those at the left hand end of the assembly, is a ring of inlet guide blades while the other two rings of stator blades are the normal interstage blades. It will readily be apparent that a construction according to the invention may be employed to control the angles of incidence of the blades in one or more blade rings.

In many cases the movement of the control ring or sleeve H would be effected automatically by some mechanism responsive to the operating condition of the engine with which the compressor is associated, for example by mechanism arranged to be influenced by engine speed, air inlet temperatures or other variable, but since such mechanism in itself forms no part of the present invention, it is not illustrated and will not be further described.

Further it will be seen that, in the arrangement shown in the drawings, in which the movable parts of the assembly are mounted on anti-friction bearings or rollers, small operating loads will be required while, moreover, the arrangement does not greatly increase the over-all dimensions of the compressor, and thermal expansion is allowed for while a one-piece tubular casing can be used as shown at B, thus enabling this to be a light alloy casing if desired.

What we claim as our invention and desire to secure by Letters Patent is:

1. A stator blade ring assembly for an axial flow compressor or the like comprising at least two rings of stator blades spaced apart in the axial direction with each blade extending outwardly from the center part of the compressor, across an annular passage through which the working fluid is to flow, each blade mounted to pivot about an axis which is coincident with or parallel to its longitudinal axis, at least one outer blade supporting ring in which the outer ends of the blades are pivotally supported, a cam member rigidly secured to the outer end of each blade and projecting therefrom in a direction having a substantial radial component relatively to the pivotal axis of the blade, the shape of the cam members secured to the blades of one ring being different from the shape of the cam members secured to the blades of another ring, an operating sleeve surrounding the blade supporting ring and carrying a series of follower members respectively engaging the cam members, and movable bodily in a direction parallel to the axis of the blade-supporting ring so that the follower members act simultaneously on the cam members to rock the blades of one ring about their pivotal axes simultaneously with, but through a different angle from, the blades of another ring.

2. A stator blade ring assembly as claimed in claim 1 in which each of the cam members is in the form of an arm having an arcuate slot formed therein, the sides of the slot constituting the cam surfaces, while each follower is in the form of a member lying within the slot so as to engage the sides thereof.

3. An axial flow compressor having at least two stator blade ring assemblies each constructed as claimed in claim 1 wherein the operating sleeves of the various blade ring assemblies are rigid with one another, as by being formed as a unit.

4. An axial flow compressor or the like having at least two stator blade ring assemblies each constructed as claimed in claim 1 wherein the operating sleeves of the various blade ring assemblies are rigid with one another, as by being formed as a unit.

References Cited in the file of this patent

UNITED STATES PATENTS

| | | |
|---|---|---|
| 2,371,706 | Planiol | Mar. 20, 1945 |
| 2,500,070 | Hagen | Mar. 7, 1950 |

FOREIGN PATENTS

| | | |
|---|---|---|
| 701,576 | Great Britain | Dec. 30, 1953 |